INVENTOR.
JAMES J. PASTORIZA

United States Patent Office 2,891,244
Patented June 16, 1959

2,891,244
TARGET ASSIGNMENT SYSTEM FOR RADAR TRACKING APPARATUS

James J. Pastoriza, Boston, Mass., assignor to the United States of America as represented by the Secretary of the Air Force Application August 8, 1956, Serial No. 602,944

4 Claims. (Cl. 343—7.3)

(Granted under Title 35, U.S. Code (1952), sec. 266)

The invention described herein may be manufactured and used by or for the United States Government for governmental purposes without payment to me of any royalty thereon.

This invention relates to radar tracking systems and more particularly to target assignment devices for radar tracking apparatus of the type having a plurality of tracking channels operating with a single search radar.

In the use of radar for monitoring a number of targets simultaneously, as in aircraft traffic control or air defense, the need for speed of operation of the apparatus involved to facilitate rapid decisions by the operator is of great importance. Such speed is necessary in both of two separate functions. One is the need for speed in providing a readily usable output signal during the tracking operation. The other is the need for speed in assigning the tracking apparatus to a selected target for the tracking operation. A solution to the first may be found in my applicaion entitled Automatic Tracking Apparatus, bearing Serial No. 587,439, filed May 25, 1956, wherein a plurality of automatic radar tracking channels operating with a single search radar is disclosed. A solution to the other is found in the present invention which involves improved apparatus for rapidly assigning a selected target to a particular tracking channel for the tracking operation.

Accordingly, a prime object of the present invention is the provision of a target assignment system capable of rapidly assigning a selected radar target to an individual tracking channel.

Another object is the provision of a target assignment system capable of automatically monitoring the individual tracking channels and identifying the channel assigned to a selected target.

A further object is the provision of a target assignment system which reduces the assignment operation to merely the rapid closing of a switch and the placing of a probe on the image of the selected target on the radar plan position indicator.

These objects, features and advantages are achieved generally by providing an electrically resistive overlay for the plan position indicator in the search radar, a circuit arrangement for generating in the overlay a voltage gradient proportional to the rectangular coordinates of respective target positions on the overlay, a probe arrangement for picking off from the resistance overlay the coordinate voltages of any selected target position and a manual switching arrangement for making circuit between the probe arrangement and a target tracking channel.

Proper control of the assignment function is achieved by providing the switching arrangement with stepping switches for monitoring the individual tracking units and light circuits for identifying the particular target tracking unit operating on the selected target. The operator is thereby kept informed of the channels assigned to particular targets and those available for assignment.

By providing unidirectional current valves oriented to pass current in one direction through the resistive overlay from one of the coordinates and in a direction perpendicular to the first for the other coordinate a conventional alternating current power source may thereby be used for providing a rectangular coordinate voltage pattern on the resisitive overlay.

By providing a comparison circuit in operative relation to the stepping switches, with the comparison circuit in control relation to the light circuits, an arrangement for comparing the coordinate output voltages of the tracking units with the coordinate voltages of a selected target at the probe is achieved together with an inexpensive arrangement for indicating the results of the comparison.

These and other features, objects and advantages of the invention will become more apparent from the following description taken in connection with the accompanying drawings wherein.

Figure 1:
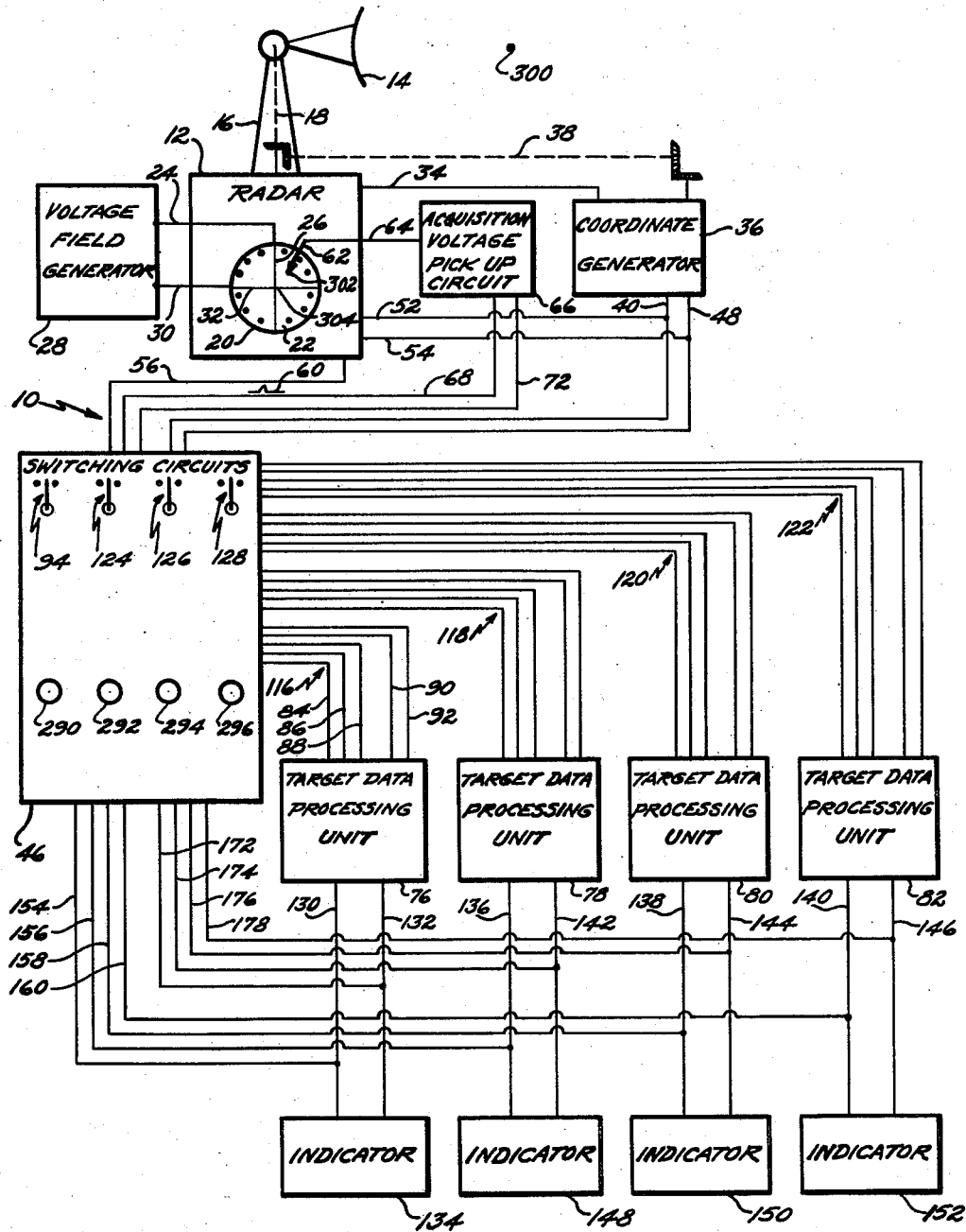
Fig. 1 is a block diagram of a radar tracking system with the present invention incorporated therein.

Referring to Fig. 1 in more detail, a radar tracking apparatus incorporating a target assignment system made in accordance with the present invention is designated generally by the numeral 10. The radar tracking apparatus 10 has a search radar unit 12 which includes a scanning antenna 14 rotatably mounted on a support 16 and driven by a gear linkage 18. The search radar 12 also includes a plan position indicator 20 over which is placed on overlay 22 of electrically resistive material. The overlay 22 consists preferably of a transparent resistive film on a transparent base as glass or plastic. The resistive overlay 22 is connected by a line 24 along a Y coordinate axis 26 to a voltage field generator 28. The voltage field generator 28 is also connected through a line 30 along an X coordinate axis 32 of the resistive overlay 22. The resistive overlay 22 and voltage field generator 28, circuits of which will be described in more detail in connection with Fig. 4, together provide an electric potential gradient on the plan position indicator 20 proportional to the X and Y coordinate positions on the overlay 22 for purposes which will be hereinafter further described.

Figure 3:
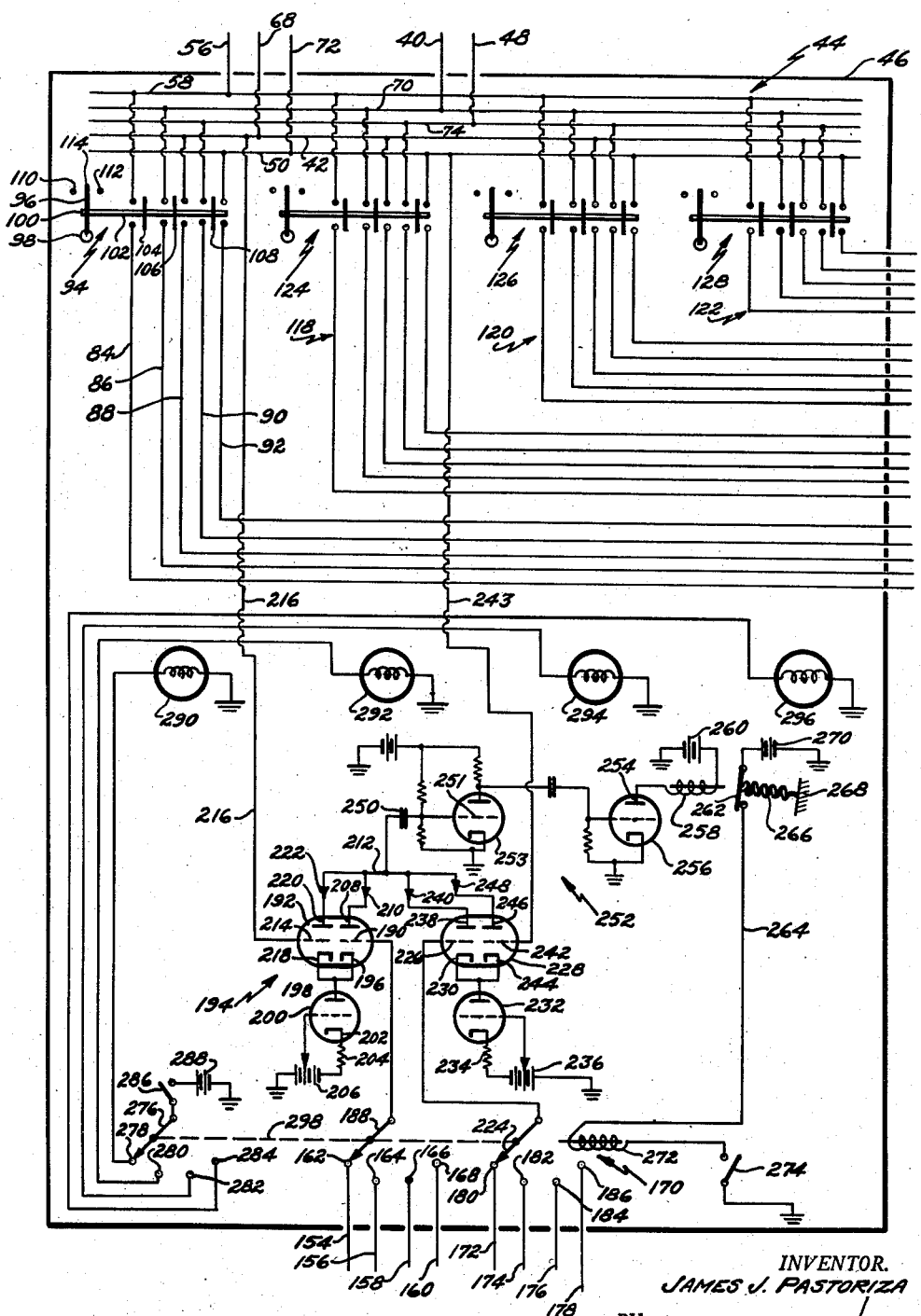
Fig. 3 is a schematic diagram of a switching circuit arrangement suitable for use in the embodiment shown in Fig. 1.

Still referring to Fig. 1, the radar unit 12 is connected through a line 34 to a coordinate generator 36 which constitutes part of the search radar 12 and is described in detail in my application entitled Automatic Tracking Apparatus, bearing Serial No. 587,439, filed May 25, 1956. The gear linkage 18 is connected through another gear linkage 38 for synchronizing operation of the coordinate generator 36 with the scan of the antenna 14. The coordinate generator 36 is connected by an X coordinate sawtooth voltage line 40 to a line 70 in a data feed network 44 in an assignment and switching circuit 46 (Figs. 1 and 3). The coordinate generator 36 is also connected by a Y coordinate sawtooth voltage output line 48 to line 74 in the data feed network 44. The X and Y output lines 40 and 48, respectively, are also connected through lines 52 and 54 to the radar unit 12 for providing the polar coordinate deflection fields in the plan position indicator 20. The radar unit 12 is also connected through a line 56 to a line 58 in the data feed network 44 for carrying target echo pulses 60.

The coordinate voltages of a selected target appearing on the plan position indicator 20 may be picked off from the resistive overlay 22 by a probe 62 (Fig. 1) connected through a line 64 to an acquisition voltage pick-up circuit 66. The X coordinate voltage picked up in this manner is fed through a line 68 connected from the acquisition voltage pick-up circuit 66 to the line 42 in the data feed network 44. The Y coordinate voltage picked up in this manner is feed through a line 72 connected from the acquisition voltage pick-up circuit 66 to a line 50 in the data feed network 44.

A circuit suitable for use as the aquisition voltage pick-up circuit 66 will be described in further detail in connection with Fig. 2 herein.

The radar tracking apparatus 10 also includes a plurality of target data processing units 76, 78, 80 and 82. While only four target data processing units are shown herein, for illustrative purposes, a larger number may also be used with the associated circuitry to provide a plurality of channels arranged similar to that to be herein described. Data information lines 58, 70, 42, 74 and 50 are connected through lines 84, 86, 88, 90 and 92 to the target data processing unit 76.

The lines 84, 86, 88, 90 and 92 are associated with an electric switch 94 controlled by a switch arm 96 connected at one end to a fixed pivot 98 and at point 100 to an operating rod 102 having electrically conductive switching members 104, 106 and 108. By moving the switch arm 96 left to the terminal 110, the members 104, 106 and 108 will close the circuits in the lines 84, 86 and 90 respectively. By moving the arm 96 to the right to the terminal 112 the conductive switching members 106 and 108 will close the circuits in the lines 88 and 92, respectively. When the arm 96 is at the terminal 114, as shown in Fig. 3, all of the lines 84, 86, 88, 90 and 92 are in open circuit.

The lines 84, 86, 88, 90 and 92 comprise a data transmission network or channel 116. Similar data transmission networks or channels 118, 120 and 122 are provided for the target data processing units 78, 80 and 82, respectively. Likewise, each of the data transmission networks 118, 120 and 122 is provided with an operating switch 124, 126 and 128, respectively, identical in structure and operation to the operating switch 94 hereinabove described.

The target data processing unit 76 has an X coordinate output line 130 and a Y coordinate line 132 connected to an indicator 134. Similarly, the target data processing units 78, 80 and 82 each have X coordinate output lines 136, 138 and 140 and Y coordinate lines 142, 144 and 146, respectively, connected to indicators 148, 150 and 152. Each of the X coordinate lines 130, 136, 138 and 140 is connected through lines 154, 156, 158 and 160, respectively, to terminals 162, 164, 166 and 168, respectively, in a stepping switch 170. Similarly, each of the Y coordinate lines 132, 142, 144 and 146 is connected through lines 172, 174, 176 and 178 to terminals 180, 182, 184, and 186, respectively, in the stepping switch 170.

In the stepping switch 170 (Fig. 3), a switch arm 188 is associated with the terminals 162, 164, 166 and 168 for X coordinate information and is connected to a control grid 190 in an electron tube 192 of a differential amplifier circuit 194. The control grid 190 also has associated therewith a cathode 196 connected to an anode 198 of a constant current tube 200 having a cathode 202 connected through a resistor 204 to the negative terminal of a power source such as a battery 206, the positive terminal of which is connected to ground. The control grid 190 also has an anode 208 connected through a diode 210 to a common line 212. A second control grid 214 in the electron tube 192 is connected through a line 216 to the X coordinate acquisition voltage line 42 in the data feed network 44. The control grid 214 also has a cathode 218 connected to the anode 198 of the constant current tube 200 and an anode 220 connected through a diode 222 to the common line 212.

In similar manner, the Y coordinate terminals 180, 182, 184 and 186 in the stepping switch 170 have associated therewith a switching arm 224 connected to a control grid 226 in a second differential amplifier tube 228 in the circuit 194.

The control grid 226 (Fig. 3) has associated therewith a cathode 230 connected through a constant current electron tube 232, a resistor 234 to the negative terminal of the power source, as a battery 236, the positive terminal of which is connected to ground. The constant current tube 232 and associated circuitry may be similar to the constant current tube 200 and its associated circuitry. The control grid 226 of the different amplifier tube 228 has also associated therewith an anode 238 connected through a diode 240 to the common line 212. The differential amplifier tube 228 has a second control grid 242 connected through line 243 to the Y coordinate acquisition voltage line 50. The grid 242 is also associated with a cathode 244 having a common connection with the cathode 230 leading to the constant current tube 232. The control grid 242 also has associated therewith an anode 246 connected through another diode 248 to the common line 212.

The common line 121 is connected through a capacitor 250 to a control grid 251 of an electron tube 253 in a limiter and amplifier circuit 252, the output of which appears at an anode 254 of an amplifier and inverter tube 256. The anode 254 is connected through a magnetic cored solenoid 258 to the positive terminal of a power source, as a battery 260, the negative terminal of which is connected to ground. The solenoid 258 is placed in operative relation to a switch arm 262 normally held in closed circuit with a line 264 by a spring 266 fastened at one end to the arm 262 and at the other end to a rigid support 268. The line 264 is connected at one end to a power source, as a battery 270, and at the other end through a second magnetic cored colenoid 272 and a manually operated switch 274 to ground.

A third switching arm 276 in the stepping switch 170 has associated therewith terminals 278, 280, 282 and 284. The switching arm 276 is connected at one end through a manually operated switch 286 to one terminal of a power source, as a battery 288, the other end of which is connected to ground. The other end of the switching arm 276 may selectively make electrical engagement with the associated terminals 278, 280, 282 and 284, each of which is in turn connected through a light bulb indicator 290, 292, 294 and 296, respectively, to ground.

The switching arms 276, 188 and 224 in the stepping switch 170 are held together by a mechanical linkage 298 to cause them to move in unison when energized by the solenoid 272 of the stepping switch 170.

In the operation of the radar tracking apparatus incorporating the target assignment system in accordance with the present invention and designated by the numeral 10, reference is herein made to my application entitled automatic tracking apparatus for a detailed description of the operation of the radar tracking arrangement shown herein. The description of the operation of the tracking apparatus will, therefore, be minimized herein and mentioned only insofar as necessary for the understanding of the present target assignment system.

As has been pointed out in my application entitled Automatic Tracking Apparatus, bearing Serial No. 587,439, filed May 25, 1956, a selected airborne target 300 (Fig. 1) picked up by the scanning antenna 14 will appear on the plan position indicator 20 as a blip or target image 302 in a position with respect to the X axis 32, and Y axis 26 comparable to the position of the target 300 with respect to the antenna axis 18. The voltage field generator 28 creates a voltage gradient in the resistive overlay 22 such that by manually placing the probe 62 on the blip or target image 302, X and Y coordinate voltages representing target 300 position will appear through the line 64 at the acquisition voltage pick-up circuit 66. These X and Y coordinate voltages are suitably detected and amplified in the acquisition voltage pick-up circuit 66 as will be herein described in connection with Figs. 2 and 4, so as to provide X and Y coordinate voltages proportional to the target 300 position. These X and Y coordinate voltages will appear through lines 68 and 72 from the acquisition voltage pick-up circuit 66 in the lines 42 and 50, respectively, of the data feed network 44 (Fig. 3) for utilization in target acquisition as will be herein described.

As has been described in my application entitled Automatic Tracking Apparatus, bearing Serial No. 587,439, filed May 25, 1956, in order to assign a target data processing unit, as the target data processing unit 76, to a selected target 300 it is necessary to initially insert the X and Y coordinate position voltages of the selected target 300. To assign the target data processing unit 76 to the selected target 300 in the present embodiment requires only placing the probe 62 on the target image 302 and moving the switch arm 96 (Fig. 3) in the assignment switch 94 to the right to the terminal 112. Thereby, the circuit between line 88 and the X coordinate line 42 is closed by the conductive elements 106. Similarly, the circuit between line 92 and the Y coordinate voltage line 50 is closed by the conductive elements 108. Thus, the X and Y coordinate voltages from the acquisition voltage pick-up circuit 66 will appear at the target data processing unit 76 to effect the desired assignment to tracking the selected target 300.

In similar manner, the target 300 or any other desired target picked up by the antenna 14 and appearing on the plan position indicator 20 may be assigned to any of the other target data processing units 78, 80 or 82. All that is necessary is the physical placement of the probe 62 over the selected target image on the plan position indicator 20 and the movement to the right of the switch arm in the particular associated switch 124, 126 or 128.

This assignment operation is a very rapid one. For example, for the assignment of the target 300 to the target data processing unit 76 requires the movement of the switch arm 96 to the terminal 112 for only a brief period. Thereafter, the switch arm 96 is moved to the left to the terminal 110 for automatic tracking of the target 300. Such movement of the switch arm 96 to the terminal 110 causes the closing of the circuit between line 84 and line 58 which carries the target video pulse 60 of the selected target 300. It also causes a closed circuit between the line 86 and the line 70 carrying the X coordinate sawtooth voltage signal from the coordinate generator 36. It also causes a closed circuit between the line 90 and the line 74 which carries the Y coordinate sawtooth voltage signal from the coordinate generator 36 for automatic tracking of the selected target 300 in manner which has been explained in detail in my application entitled Automatic Tracking Apparatus, bearing Serial No. 587,439, filed May 25, 1956.

To identify the particular target data processing unit 76, 78, 80 or 82 which has been assigned to the selected target 300 requires only the manual closing of the switches 274 and 286. Thereby, the solenoid 272 of the stepping switch 170 will be energized. Energizing the solenoid 272 will cause the switching arms 276, 188 and 224 to move in unison from one to the other of the associated terminals. If, for example, the target 300 has been assigned to the target data processing unit 76, the X and Y coordinate position voltages of the target 300 will appear in the output lines 130 and 132, respectively. They will, thereby, also appear through lines 154 and 172 at the terminals 162 and 180, respectively. If the switching arms 188 and 224 are on the terminals 162 and 180, these X and Y coordinate position voltages will be made to appear at control grids 190 and 226, respectively. By placing the probe 62 on the target image 302, the X and Y coordinate target position voltages will, thereby, also be made to appear from the acquisition voltage pick-up circuit 66 at the control grids 214 and 242, respectively, in the differential amplifier circuit 194. The differential amplifier circuit 194 is designed in a manner such that when the voltage at the control grid 214 is the same as the voltage at the control grid 190 in the tube 192 at the same time as the voltage at the control grid 226 equals the voltage at the control grid 242, a rise in potential will occur at the common line 212 so as to energize the solenoid 258. A more detailed description of the operation of a differential amplifier circuit of this type may be found in my application entitled Automatic Tracking Apparatus, bearing Serial No. 587,439, filed May 25, 1956. Energizing of the solenoid 258 causes the switch arm 262 to move in the direction of the solenoid 258 so as to open the circuit in the line 264 to prevent any further movement of the switching arms 224, 188 and 276 in the stepping switch 170. Thus, under the conditions just described, the switching arm 276 will be on the terminal 278 effecting a closed circuit between the power source 288 and the light indicator 290 which identifies the target data processing unit 76 as being the unit assigned to the selected target 300. In similar manner, the other indicator lights 292, 294 and 296 identify the other target data processing units 78, 80 and 82, respectively.

Figure 4:
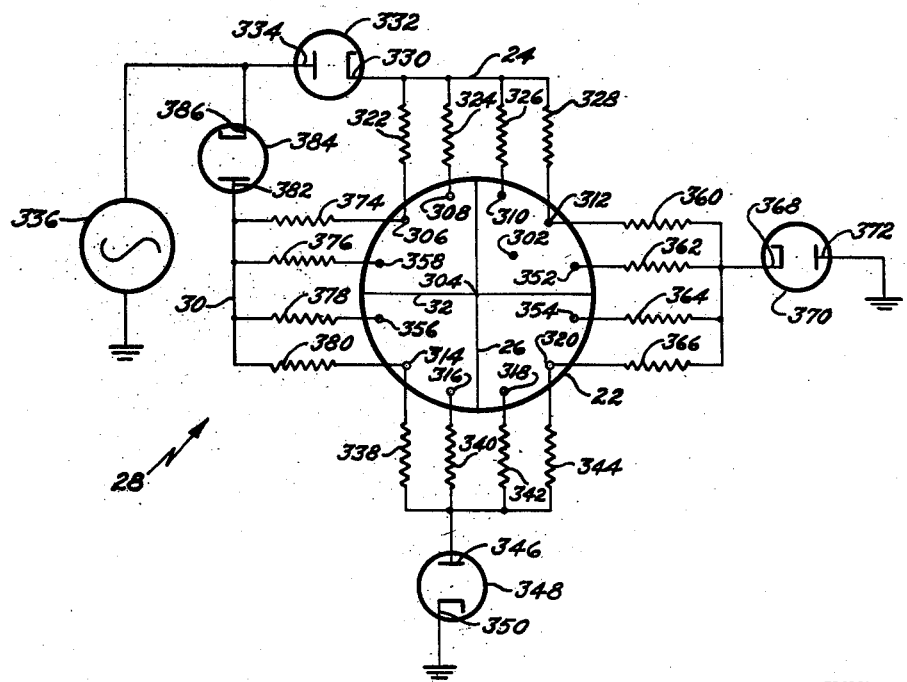
Fig. 4 is a schematic diagram of a resistive overlay and voltage field generating circuits suitable for use in the embodiment shown in Fig. 1.

A suitable circuit arrangement for the voltage field generator 28 is shown schematically in Fig. 4, where all but the resistive overlay 22 may be considered as the voltage field generator 28 shown in block form in Fig. 1. Referring to Fig. 4 in more detail, the resistive overlay 22 may be an electrically resistive transparent coating on a glass plate of circular construction to fit over the plan position indicator 20. The resistive overlay 22 has circumferentially thereof equally spaced terminals along a circular locus about a center point 304. One set of terminals 306, 308, 310, 312, 314, 316, 318 and 320 are disposed in pairs at diametrically opposed positions, each pair defining lines parallel to the Y coordinate axis 26. The terminals 306, 308, 310 and 312 are each connected through a resistor 322, 324, 326 and 328, respectively, and a line 24 to a cathode 330 of a diode 332 having an anode 334 connected to one terminal of an alternating current power source as a generator 336, the other terminal of which is connected to ground. The diametrically opposed terminals 314, 316, 318 and 320, respectively, are connected through resistors 338, 340, 342 and 344 to an anode 346 of a diode 348 having a cathode 350 which is connected to ground.

Similarly, a set of terminals 312, 352, 354, 320, 314, 356, 358 and 306 are disposed in pairs of terminals in diametrically opposed relation to each other, each pair defining lines parallel to the X coordinate axis 32. The terminals 312, 352, 354 and 320 are connected through resistors 360, 362, 364 and 366, respectively, to a cathode 368 of a diode 370 having an anode 372 connected to ground. The opposing terminals 306, 358, 356 and 314 are connected through resistors 374, 376, 378 and 380, respectively, and line 30 to an anode 382 of a diode 384 having a cathode 386 connected through a common line with the anode 334 to a terminal of the generator 336.

The alternating current generator 336 generates a sinusoidal wave form with zero direct current component. Because of the orientation of the diodes 332 and 348, during the positive half cycles of this sinusoidal wave form, current will flow through the resistive overlay 22 in the direction of the Y axis 26 only. The diodes 384 and 370 are oriented to effectively cut off current flow along the X axis 32 during these positive half cycles.

During the negative cycles of the sinusoidal wave from the generator 336, current will flow in the direction of the X axis 32 only because of the orientation of the diodes 384 and 370. Thus, in this manner, two perpendicular fields are alternately generated across the resistive overlay 22 at the frequency of the sine wave power source 336. The resistances 322, 324, 326, 328, 340, 342 and 344 along with the resistive value of the overlay 22 are carefully selected to provide a linear X potential gradient on the face of the resistive overlay 22 corresponding to the position along the Y axis 26. Likewise, the other set of resistors 360, 362, 364, 366, 374, 376, 378 and 380 along with the resistive value of the overlay 22 are carefully selected to provide a linear potential gradient on the face of the resistive overlay 22 proportional to the position along the X axis 32. Thus, during one half cycle of the power source 336, a voltage gradient will appear on the face of the overlay 22 for one axis and during the other half cycle an identifying gradient will appear for the other axis. A voltage sample taken by the probe 62 at any point on the overlay 22 will yield a periodic function whose peak positive value in proportional to the Y position of the probe 62 and whose peak negative value is proportional to the X position of the probe 62.

Figure 2:
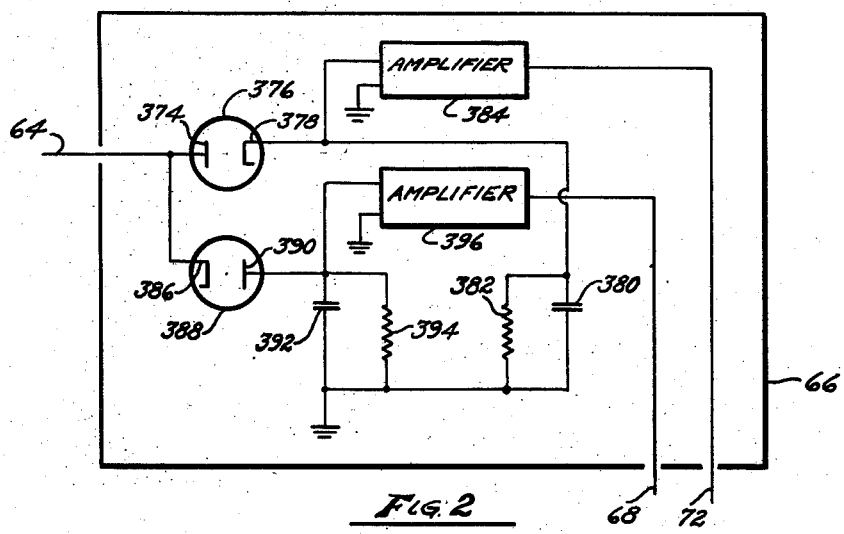
Fig. 2 is a schematic diagram of an acquisition voltage pick-up circuit suitable for use in the embodiment shown in Fig. 1.

A suitable circuit for use as the acquistition voltage pick-up circuit 66 is shown in partially block and partially schematic form in Fig. 2. Referring to Fig. 2, in more detail, the line 64 leading from the probe 62 is connected to an anode 374 of a diode 376 having a cathode 378 connected through a capacitor 380 and leakage resistor 382 to ground. The cathode 378 is also connected through a direct current amplifier 384 to the Y coordinate output line 72.

Conversely, the line 64 from the probe 62 is connected to a cathode 386 of another diode 388. The diode 388 has an anode 390 which is connected through a capacitor 392 and leakage resistor 394 to ground. The anode 390 is also connected through a direct current amplifier 396 of conventional design to the X coordinate output line 68.

In the operation of the acquisition voltage pick-up circuit 66, during positive half-cycles of the generator 336, current will flow only through the diode 376, charging the capacitor 380 to the peak positive value found on the overlay 22 at the position of the probe 62. This voltage is suitably amplified in the amplifier 384 to produce a Y coordinate voltage in the output line 72 which corresponds to the Y coordinate position voltage of the target image as target image 302 at the probe 62. During the negative half-cycles of the generator 336, current will flow only through the other diode 388 to cause the capacitor 392 to charge to the peak value of the negative voltage on the overlay 22 corresponding to the position of the probe 62. This value is suitably amplified in the amplifier 396 to produce in the X coordinate output line 68 an X coordinate voltage corresponding to the X coordinate position of the target image 302 at the probe 62.

This invention is not limited to the specific details of construction and operation described as equivalents will suggest themselves to those skilled in the art.

What is claimed is:

1. A target assignment system for a radar tracking apparatus of the type having a plurality of tracking means assignable to selected targets by applying to a tracking means a pair of voltages proportional to the coordinates of the selected target and a plan position indicator for displaying the radar targets, said assignment system comprising an electrically resistive overlay for the plan position indicator, means for generating in said resistive overlay a voltage proportional to the coordinates of respective target positions on said indicator, probe means for deriving from said resistive overlay the coordinate voltages of a selected target on said indicator, and manually controlled switching means for applying said last-mentioned coordinate voltages to a selected one of the tracking means.

2. A target assignment system as in claim 1, wherein said means for generating a voltage in the resistive overlay comprises two sets of electrical contact points along a circular locus about a center point on said surface, one set of points being disposed at each of a pair of diametrically opposed positions with respect to an X rectangular coordinate axis, and the other set of electrical contact points disposed at each of a pair of diametrically opposite positions with respect to a Y rectangular coordinate axis, an electrical resistance element in electrical engagement with each of said contact points for making circuit with a power source, said resistance elements being proportioned to establish a potential distribution in said resistive overlay that varies in magnitude in proportional relation to the X and Y coordinate position on said overlay, unidirectional means in operative engagement with said resistor elements, said unidirectional means being oriented to pass current from said power source through said one set of points in the X coordinate direction during one half cycle of said power source and through the other set of points in the Y coordinate direction during the other half cycle of said power source.

3. For a target assignment system in a radar tracking apparatus of the type having a search radar and a plan position indicator for displaying the radar targets, a target cordinate voltage generating means comprising a transparent film of electrically resistive material for covering the plan position indicator, two sets of electrical contact points transverse to each other about a center point on the resistive film, an X and a Y axes through said center point on said resistive film, one set of points being disposed at each of a pair of opposed positions with respect to the X axis, and the other set of electrical contact points being disposed at each of a pair of opposed positions with respect to the Y axis, an electrical resistance element in electrical engagement with each of said contact points for making circuit with a power source, said resistance elements being proportioned to establish a potential distribution in said resistive film varying in proportional relation to the X and Y position on said resistive film, diodes in operative engagement with said resistor elements, said diodes being oriented to pass current from said power source through said one set of points in the Y direction during one half cycle of said power source and through the other set of points in the X direction during the other half cycle of said power source, a probe for electrically engaging a selected position on said resistive film corresponding to a selected target on said indicator, a pair of diodes in parallel with said probe, one of said diodes oriented to pass current in one direction and the other oriented to pass current in the opposite direction, and means in circuit with each of said diodes for amplifying the peak voltage of each of said half cycles at said probe to a pair of voltages proportional to the X and Y coordinate positions of the selected target.

4. For a target assignment system in a radar tracking apparatus of the type having a search radar and a plan position indicator for displaying the radar targets in polar positions about a center point on said indicator, a coordinate field voltage generating means comprising a rigid transparent dielectric base for positioning over said plan position indicator, a film of transparent electrically resistive material on said base, a center point on the resistive film corresponding to the center point on said indicator, X and Y axes through said center point on said resistive film, a first set of electrical contact points on the resistive film disposed on opposite sides of the X axis, a second set of electrical contact points on the resistive film disposed on opposite sides of the Y axis, an electric resistor in electrical engagement with each of the contact points for making circuit with a power source, said resistors having resistance values proportioned to establish a potential distribution in said resistive film that varies in proportional relation to X and Y positions on said resistive film, diodes in circuit with said first set of electrical contact points, associated resistors and power source oriented to pass current from said power source through said resistive film in the Y direction during one half cycle of said power source, and diodes in circuit with said second set of electrical contact points, associated resistors and power source oriented to pass current from said power source through said resistive film in the X direction during the other half cycle of said power source.

No references cited.